(12) United States Patent
Williams et al.

(10) Patent No.: US 6,482,250 B1
(45) Date of Patent: *Nov. 19, 2002

(54) NOZZLE FOR LOW PRESSURE FLASH TANKS FOR ORE SLURRY

(75) Inventors: Richard Williams, Toronto (CA); Larry Enloe, Elko, NV (US); Paul Wilmot, Elko, NV (US); David Dixon, Vancouver (CA)

(73) Assignee: Barrick Gold Corporation, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/513,945

(22) Filed: Feb. 28, 2000

Related U.S. Application Data

(63) Continuation of application No. 09/061,956, filed on Apr. 17, 1998, now Pat. No. 6,110,255.

(51) Int. Cl.[7] .................................................. C22B 3/46
(52) U.S. Cl. .......................................... 75/744; 266/168
(58) Field of Search .............................. 75/744; 266/168

(56) References Cited

U.S. PATENT DOCUMENTS

| 3,643,875 A | 2/1972 | Dille et al. ..................... 241/5 |
| 5,071,477 A | 12/1991 | Thomas et al. ................ 75/744 |
| 5,489,326 A | 2/1996 | Thomas et al. ................ 75/744 |
| 5,536,297 A | 7/1996 | Marchbank et al. .......... 75/744 |
| 6,110,255 A | * 8/2000 | Williams et al. ............... 75/744 |

FOREIGN PATENT DOCUMENTS

| DE | 2 164 856 | 12/1971 |
| GB | 2 174 509 | 11/1986 |
| GB | 2 178 342 | 2/1987 |

* cited by examiner

*Primary Examiner*—Scott Kastler
(74) *Attorney, Agent, or Firm*—Senniger, Powers, Leavitt & Roedel

(57) ABSTRACT

A wear-resistant flash tank pressure let down nozzle for use in passing an ore slurry into an ore slurry flash tank to release steam from the slurry and reduce the pressure of the slurry. The nozzle has an expansion cone flaring toward the discharge end of the nozzle. The cross-sectional area of a choke section of the nozzle and the exit diameter of the expansion cone are selected to establish a relationship between pressure upstream of the nozzle and pressure in the flash tank so that underflashing, overflashing, and shock waves inside the flash tank are minimized.

19 Claims, 10 Drawing Sheets

NOZZLE FOR LOW PRESSURE FLASH TANKS FOR ORE SLURRY

RELATED U.S. APPLICATION DATA

This is a continuation of Application Ser. No. 09/061,956, filed on Apr. 17, 1998, now U.S. Pat. No. 6,110,255.

BACKGROUND OF THE INVENTION

This invention relates to the release of pressure from oxidized ore slurry in an autoclave circuit. In particular, the invention relates to the design of a nozzle system through which ore slurry passes into slurry flash tanks.

Autoclave circuits are used to recover gold from refractory sulfidic ores. Ore leaving an autoclave is typically passed to a series of flash tanks where pressure is let down and steam is flashed off to cool the slurry, and reduce it to atmospheric pressure for further processing. Steam from each flash tank is recycled and contacted with autoclave feed slurry in a complementary splash condenser, operated at substantially the same pressure as the flash tank, for preheating the autoclave ore feed slurry. In one particular system the pressure from the autoclave slurry discharge is let down in two stages. In the first stage, pressure is let down from about 420 psig to about 120 psig. In the second stage, pressure is let down from about 120 psig to atmospheric. This second pressure drop corresponds to a much greater volume expansion than in the first stage.

Heretofore this second pressure drop from about 120 psig to atmospheric has been accomplished by use of a nozzle system comprising a straight tubular choke extending from outside the flash tank to inside the flash tank. The choke was surrounded by a ceramic lined blast tube extending further into to flash tank, as shown in FIG. 4. As the volume of the slurry expands rapidly upon passage through the choke, the blast tube was violently impacted with steam entrained with ore slurry. Catastrophic failure of the blast tube, resulting in ore slurry damaging and even breaching the low pressure flash tank, has occurred. The typical life of such nozzle systems, and in particular of the blast tubes, has been relatively short, for example, six weeks, depending on operating parameters, ore characteristics, and many other factors. Rebuilding and/or replacing such nozzle assemblies is expensive in terms of capital costs and in terms of process downtime.

SUMMARY OF THE INVENTION

Among the several objects of the invention, therefore, are the provision of an extended life nozzle system for a low pressure slurry flash tank; the provision of an improved apparatus for preheating gold ore slurry prior to pressure oxidation and for reducing the pressure of pressure oxidized gold ore slurry after pressure oxidation; and the provision of an improved process for reducing the pressure of pressure oxidized gold slurry.

Briefly, therefore, the invention is directed to a wear-resistant flash tank pressure let down nozzle for use in passing an ore slurry into an ore slurry flash tank to release steam from the slurry and reduce the pressure of the slurry. The nozzle has an inlet end, a discharge end, and a tubular passageway extending therebetween for passage of the slurry from a location outside the flash tank in fluid flow communication with the inlet end. The slurry passageway has a choke comprising a zone of the passageway in which its cross sectional area is smallest, the passageway flaring with respect to the axis thereof toward the discharge end to define an expansion cone. The cross-sectional area of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke.

The invention is also directed to an ore slurry flash tank apparatus for receiving and holding pressure oxidized ore slurry for reducing the pressure of pressure oxidized gold ore slurry. The apparatus has a vessel having a bottom, a top, and side walls, and a wear-resistant flash tank pressure let down nozzle. The nozzle has an inlet end, a discharge end, and a tubular passageway extending therebetween for passage of the slurry from a location outside the flash tank in fluid flow communication with the inlet end. The slurry passageway has a choke comprising a zone of the passageway in which its cross sectional area is smallest, the passageway flaring with respect to the axis thereof toward the discharge end to define an expansion cone. The cross-sectional area of the choke and the exit diameter of the expansion cone are selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke.

In another aspect, the invention is directed to an apparatus for preheating gold ore slurry prior to pressure oxidation and for reducing the pressure of pressure oxidized gold ore slurry after pressure oxidation. There is a flash tank for receiving a volume of pressure oxidized gold ore slurry, the flash tank comprising a vessel having a bottom, a top, and side walls, and a nozzle on the top of the vessel for passing ore slurry into the vessel. The nozzle has an inlet end, a discharge end, and a tubular passageway extending therebetween for passage of the slurry from a location outside the flash tank in fluid flow communication with the inlet end. The slurry passageway has a choke comprising a zone of the passageway in which its cross sectional area is smallest, the passageway flaring with respect to the axis thereof toward the discharge end to define an expansion cone. The cross-sectional area of the choke and the exit diameter of the expansion cone are selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke. There is a steam outlet for passing steam out of the flash tank, and a splash condenser for contacting ore slurry with steam prior to pressure oxidation of the ore slurry in order to preheat the ore slurry, the splash condenser having a steam inlet. There is also conduit for transferring steam from the steam outlet of the flash tank to the splash condenser.

The invention is further directed to a process for reducing the pressure of pressure oxidized ore slurry from above about 100 psig to about atmospheric. Slurry is passed through a nozzle into a flash tank, the nozzle disposed on the top of the flash tank and comprising a receiving end and a discharge end, and a slurry passageway extending through the nozzle from the receiving end to the discharge end for passage of the slurry into the flash tank from a location outside the flash tank. The slurry passageway flares outwardly at an angle of about 15° toward the discharge end to gradually reduce the pressure of the slurry and to direct the slurry such that it impacts a volume of slurry in the bottom of the flash tank.

The invention is also directed to an ore slurry flash tank apparatus for receiving and holding pressure oxidized ore slurry for reducing the pressure of pressure oxidized gold ore slurry. There is a vessel having a bottom, a top, and side walls, and a nozzle on the top of the vessel for passing ore slurry into the vessel. The nozzle has an inlet end, a discharge end, and a tubular passageway extending therebetween for passage of the slurry from a location outside the flash tank in fluid flow communication with the inlet end. The slurry passageway comprises a choke comprising a zone of the passageway in which its cross sectional area is smallest, the passageway flaring with respect to the axis thereof toward the discharge end to define an expansion cone. The nozzle has a choke diameter of between about 3½ and about 4½ inches, an expansion cone exit diameter of between about 7 and about 7½ inches, and an expansion cone length of between about 5¾ inches and about 6¾ inches, to establish a relationship between pressure upstream of the nozzle and pressure in the flash tank so that shock waves inside the flash tank are weaker than shock waves inside a reference flash tank operating under identical conditions except having a reference pressure let down nozzle comprising a straight choke.

In another aspect, the invention is directed to an ore slurry flash tank apparatus for receiving and holding pressure oxidized ore slurry for reducing the pressure of pressure oxidized gold ore slurry from between about 100 psig and about 140 psig to about atmospheric. There is a vessel having a bottom, a top, and side walls, and a nozzle on the top of the vessel for passing ore slurry into the vessel. The nozzle has a tubular passageway extending therebetween for passage of the slurry from a location outside the flash tank in fluid flow communication with the inlet end, the slurry passageway comprising a choke comprising a zone of the passageway in which its cross sectional area is smallest. The passageway flares with respect to the axis thereof toward the discharge end to define an expansion cone. The nozzle has a choke diameter of between about 3.8 and about 4.1 inches corresponding to the smallest cross-section in the slurry passageway, the straight section having a length of between about 9½ and about 10½ inches, an expansion cone exit diameter of between about 7.1 and about 7.4 inches, an expansion cone length of between about 6 inches and about 6.2 inches, and an expansion cone length of between about 14° and about 16°, to establish a relationship between pressure upstream of the nozzle and pressure in the flash tank so that shock waves inside the flash tank are weaker than shock waves inside a reference flash tank operating under identical conditions except having a reference pressure let down nozzle comprising a straight choke.

Other objects and features of the invention will be in part apparent and in part pointed out hereinafter.

DETAILED DESCRIPTION OF THE INVENTION

Figure 1:
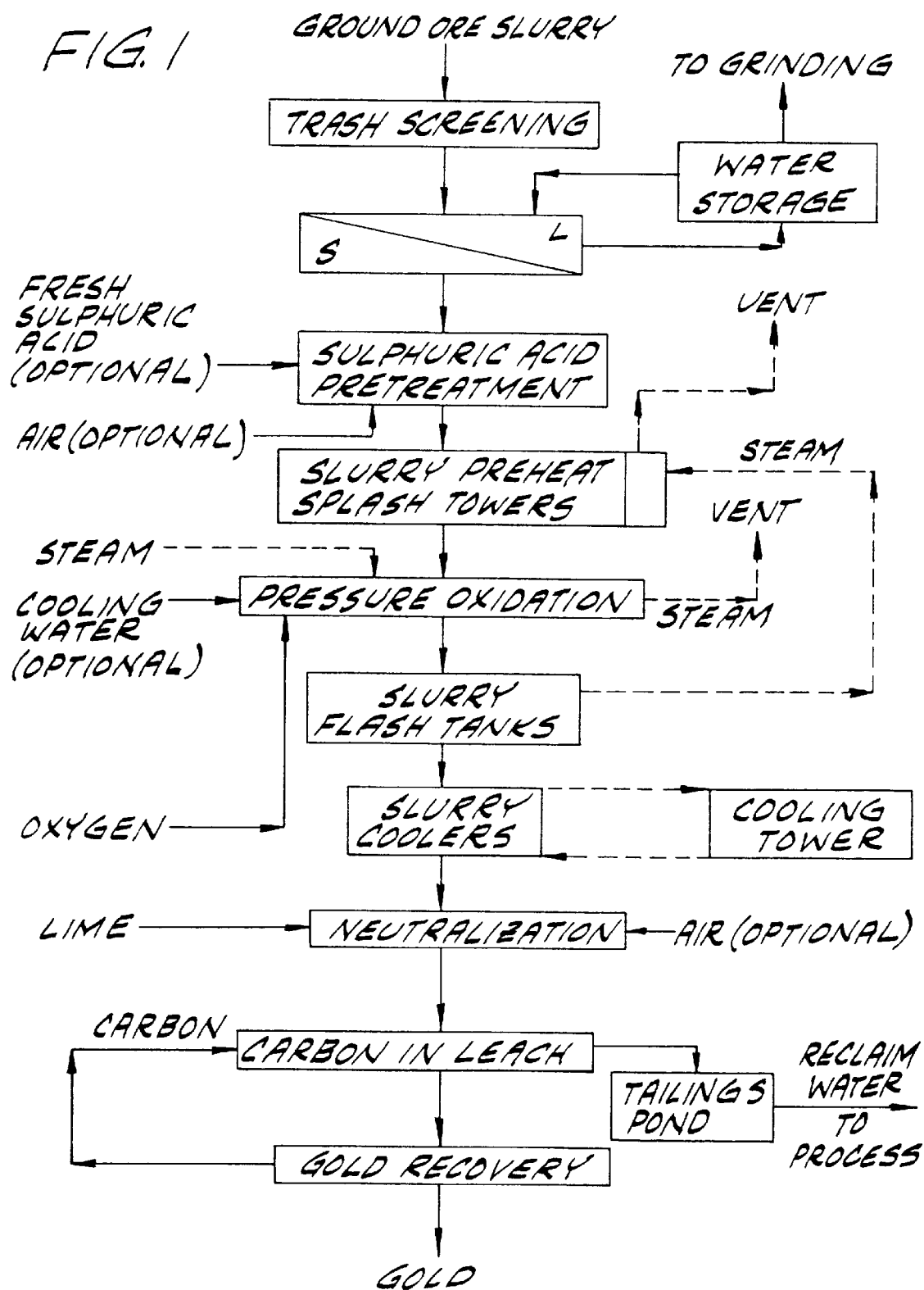
FIG. 1 is a flowsheet of a gold recovery operation in which the invention is used.

FIG. 1 illustrates a preferred gold recovery process in which the invention is used. This process is described generally in Thomas et al. U.S. Pat. No. 5,071,477 and Thomas et al. U.S. Pat. No. 5,489,326, the entire disclosures of which are expressly incorporated by reference. According to such a process, ore is crushed and wet milled, and the ground ore slurry screened for trash or tramp material. The ground ore is thickened by removal of excess water in a solid-liquid separation operation. The ore slurry is then subjected to pressure oxidation in the presence of sulfuric acid using oxygen gas at elevated pressure. It is sometimes necessary to add sulfuric acid to facilitate oxidation, so the addition of sulfuric acid to the thickened ore slurry is indicated as an optional step. Pressure oxidation is typically conducted in a horizontal multi-compartmented autoclave, the compartments of which are preferably of substantially equal volume. Energy from the exothermic pressure oxidation is recovered by heat exchange between the oxidized slurry and acidulated feed to the autoclave. As indicated in FIG. 1, this heat exchange is preferably effected by letting down the pressure of the oxidized slurry in flash tanks in which the nozzles of the current invention are used, and using the steam which is flashed from the oxidized slurry to heat the autoclave feed, preferably by direct contact in splash condensers positioned ahead of the autoclave.

After it is partially cooled by flashing of steam, the oxidized slurry is further cooled and then passed directly to a neutralization operation. Here lime and/or other base is added to increase the pH to allow for subsequent cyanide leaching. Gold is recovered from the neutralized oxidized slurry by, for example, carbon-in-leach cyanidation in a continuous countercurrent system.

Figure 2:
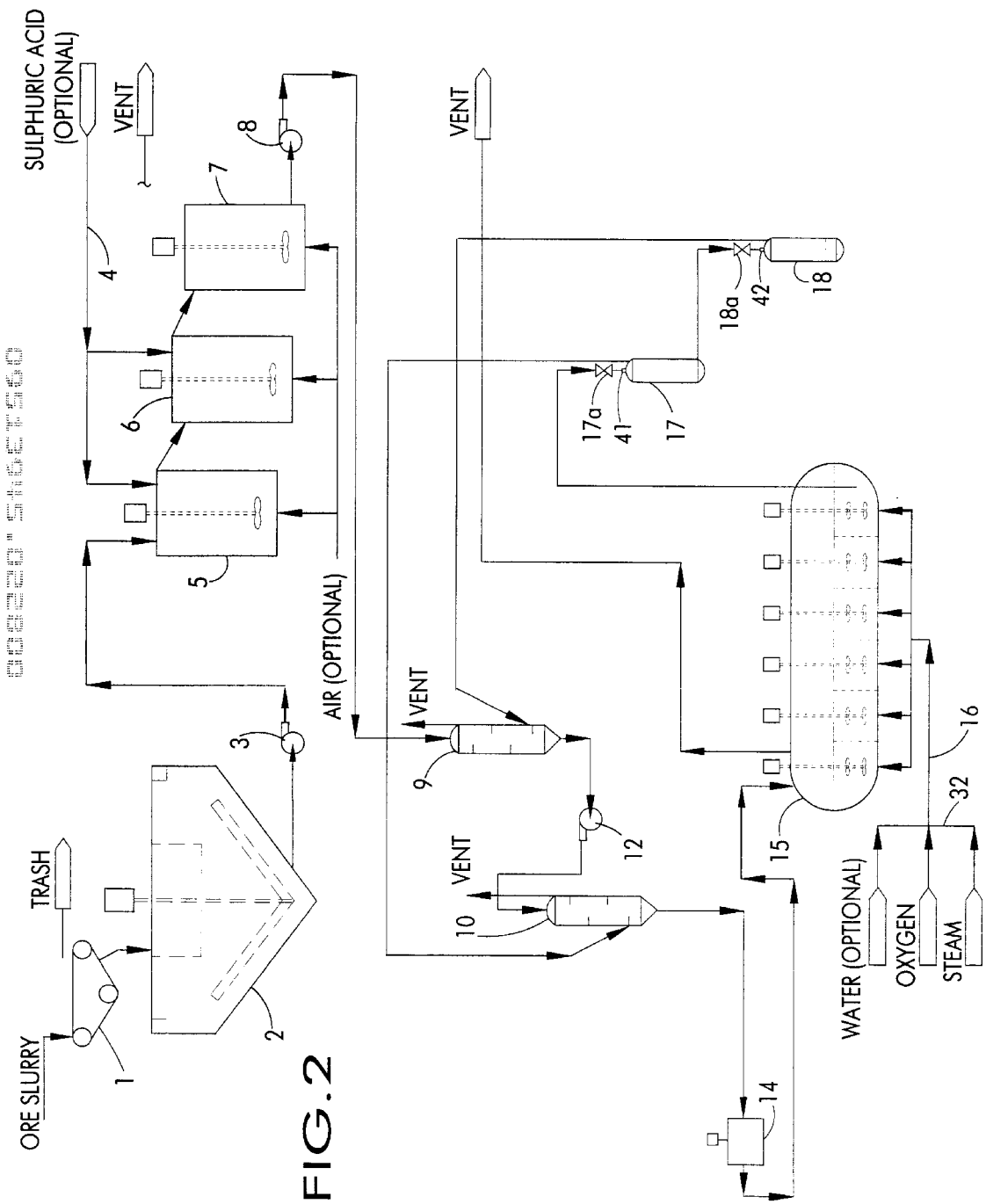
FIG. 2 is a more detailed flowsheet of part of the gold recovery operation of FIG. 1.

Referring to FIG. 2, ground ore slurry is directed to a trash screen 1; ore slurry passing through the screen is directed to a mechanical thickening device 2, typically a vertical tank of large diameter which provides a net vertical flow low enough to permit sedimentation of the solid particles. Overflow from the thickener is recycled to the grinding circuit. Thickened ore slurry underflow from the thickener is directed to another trash screen (not shown) and by a transfer pump 3 to a series of stirred acidulation tanks 5, 6 and 7, through which the slurry passes continuously. Although three stages are shown, in the preferred embodiment there are four stages. A fresh sulfuric acid stream (optional) 4 is added to the acidulation tanks in order to release carbon dioxide from the carbonate contained in the slurry, and thereby reduce the equivalent carbon dioxide levels in the ore. To promote removal of $CO_2$, compressed air may be sparged into the acidulation tanks.

Residue slurry leaving the acidulation tanks is fed by a transfer pump 8 to the first of a series of brick lined splash condensers 9 and 10, in which the treated feed slurry for the pressure oxidation step is preheated by contact with steam flashed from the oxidized slurry leaving the pressure oxidation. The successive splash condensers are each, preferably, internally baffled to promote contact between steam and liquid, and are respectively operated at progressively higher pressure and temperature. A 2-stage centrifugal pump 12 is interposed to increase the pressure of the slurry between condensers.

Pressure oxidation is carried out in an autoclave 15, where the slurry is passed through a plurality of compartments to provide a retention time of the order of 50–80 minutes, where it is contacted in the presence of sulfuric acid with oxygen gas at a temperature of between about 185° and about 225° C., an oxygen partial pressure of at least about 25 psig and a total pressure of between about 215 and about 480 psig. The final acidity of the slurry leaving the last compartment of the autoclave is between 5 and 25 grams sulfuric acid per liter of solution, and the final emf of the slurry is between about 480 and about 530 mv.

Noncondensables and steam generated during the pressure oxidation operation are optionally vented through a scrubber. Oxidized slurry leaving the autoclave is passed to a series of flash tanks 17 and 18, through control valves 17a and 18a, respectively, and through nozzle assemblies 41 and 42. In the first flash tank the pressure of the slurry is let down from about 420 psig to about 120 psig. In the second flash tank the pressure of the slurry is let down from about 120 psig to about atmospheric. Steam from each flash tank is recycled and contacted with autoclave feed slurry in a complementary splash condenser, operated at substantially the same pressure as the flash tank, for preheating the feed slurry. Thus, in the series as illustrated in the drawing, the first flash tank 17 is coupled to the last splash condenser 10, and the second flash tank 18 is coupled with the first condenser 9.

Figure 6:
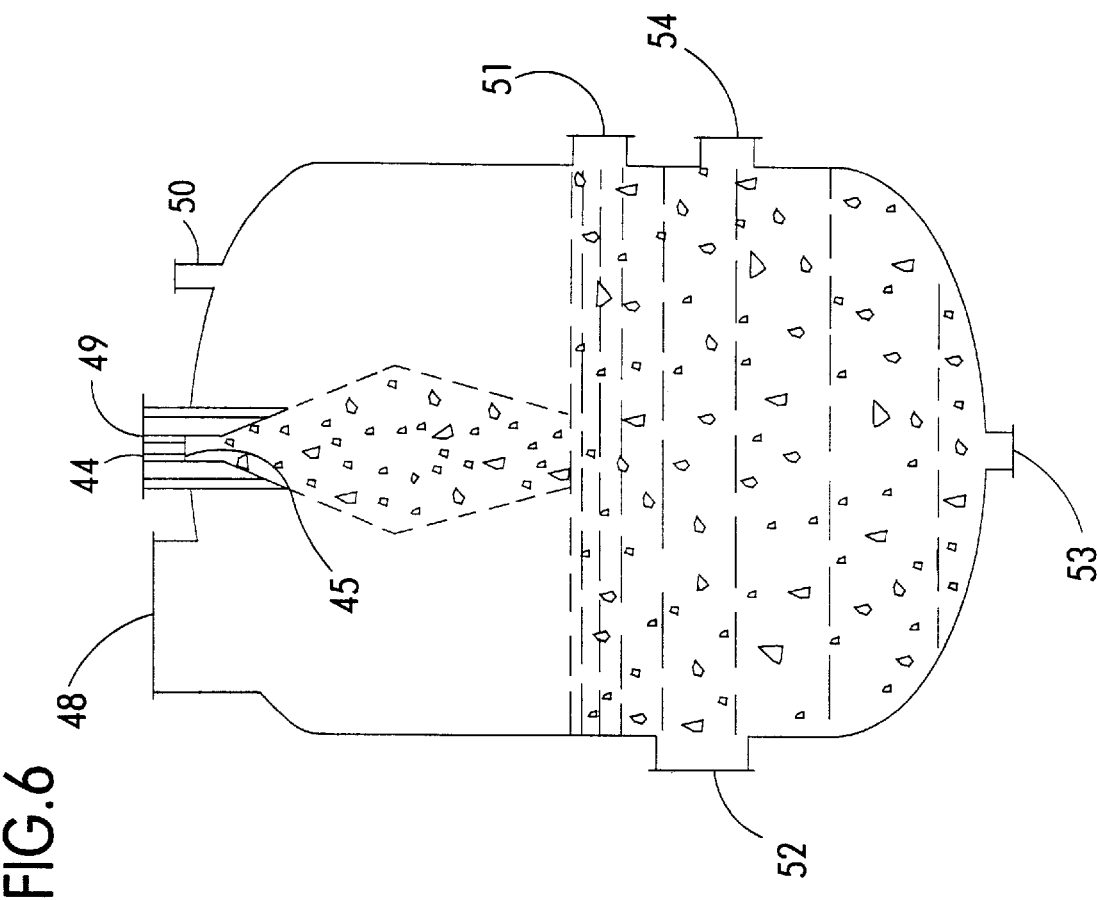
FIG. 6 is a front sectional schematic view of the low pressure flash tank nozzle of the invention installed in a flash tank.

The flash tanks are vessels of generally cylindrical shape having a dished bottom, a dished top, and parallel side walls. As shown in FIG. 6, the preferred flash tank has a slurry inlet 49, a steam outlet 48, a slurry outlet 51, a manhole 52 to permit inspection of the tank interior, a drain 53, and a blank outlet 54.

In the first flash tank, where the slurry pressure is let down from about 420 psig to about 120 psig, there is a volume expansion of the steam of from about 3 to about 3.5 times its volume at 420 psig. In the second flash tank, where the slurry pressure is let down from about 120 psig to about atmospheric, there is a volume expansion of the steam of from about 8.5 to about 9.5 times its volume at 120 psig, or on the order of 30 times its volume at 420 psig. With regard to the second flash tank, or low pressure flash tank, it is preferred that the total tank volume be between about 1.6 and about 1.9 times the volume of slurry it is to hold at any given time. In the preferred embodiment where the volume of slurry in the tank is generally maintained between about 9000 and about 10,000 gallons (U.S.), and the volume of the tank is about 16,500 gallons, this helps ensure a slurry depth adequate to receive and dissipate the energy of slurry as it enters the vessel and impacts the slurry surface.

Figure 3:
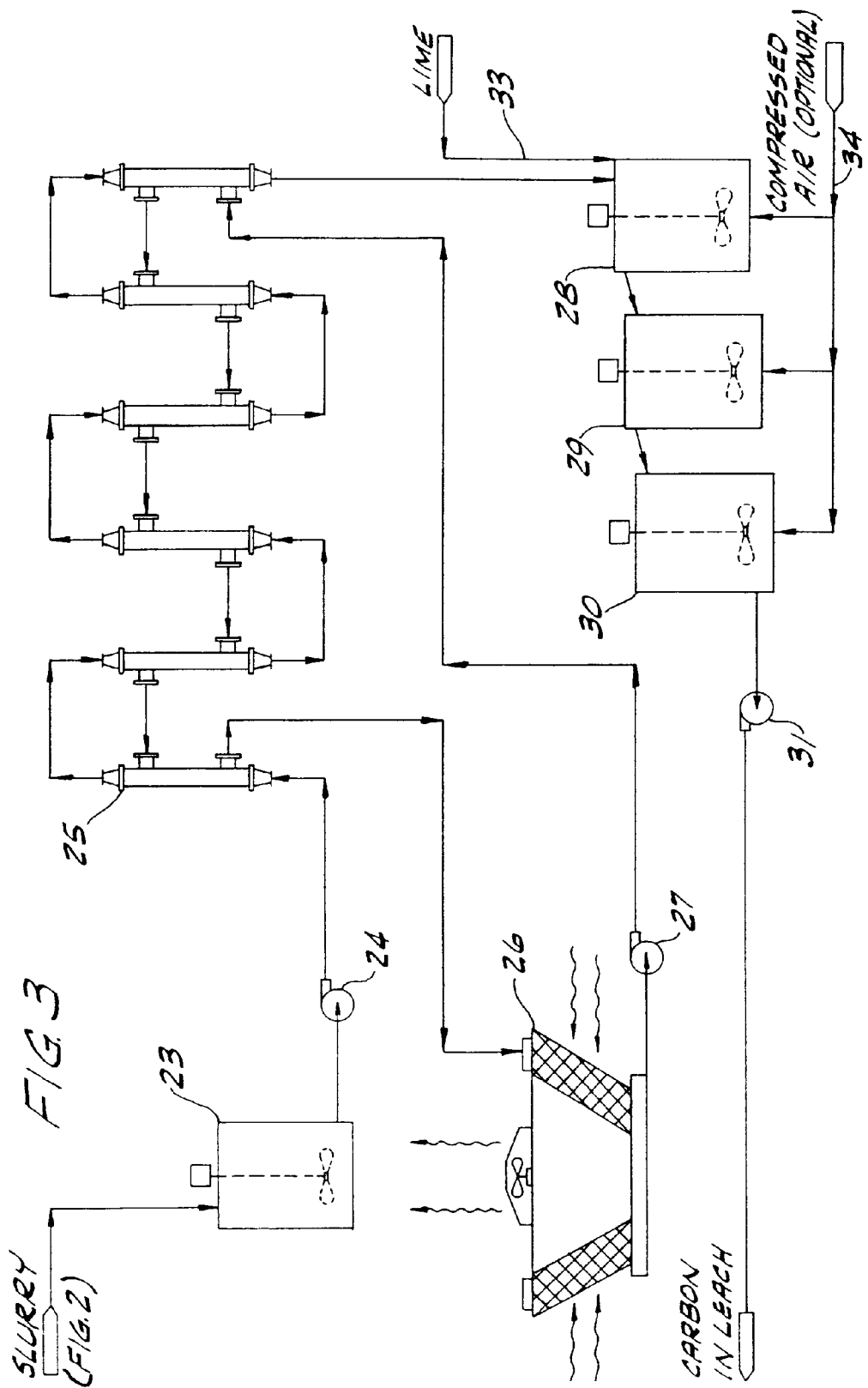
FIG. 3 is a more detailed flowsheet of a second part of the gold recovery operation of FIG. 1.

Referring to FIG. 3, hot oxidized slurry from the flash tank 18 is transferred to an intermediate agitated storage tank 23. In order to condition the slurry for gold recovery operations, the temperature of the hot oxidized slurry is reduced to about 25 to 40° C. by passing the slurry, by means of pump 24, through a series of shell and tube coolers 25. The temperature of the slurry is reduced by exchanging heat from the slurry to a cooling water stream. Cooling water is obtained from a recirculating system in which the water is recycled through a crossflow, induced draft cooling tower 26 by pump 27.

Cooled oxidized slurry which is discharged from the coolers 25 is fed continuously through a series of rubber or epoxy lined agitated neutralization tanks 28, 29 and 30, where it is neutralized with a slurry of lime and/or other base to raise its pH to the neighborhood of 10 to 12. Compressed air 34 is optionally sparged into the slurry in the neutralization tanks to convert ferrous iron to ferric iron, as the former consumes cyanide in the subsequent carbon-in-leach operation. The neutralized slurry is then directed to a carbon-in-leach operation by transfer pump 31 where the gold in the oxidized slurry is recovered by, for example, conventional carbon-in-leach (C-I-L) cyanidation.

Figure 4:
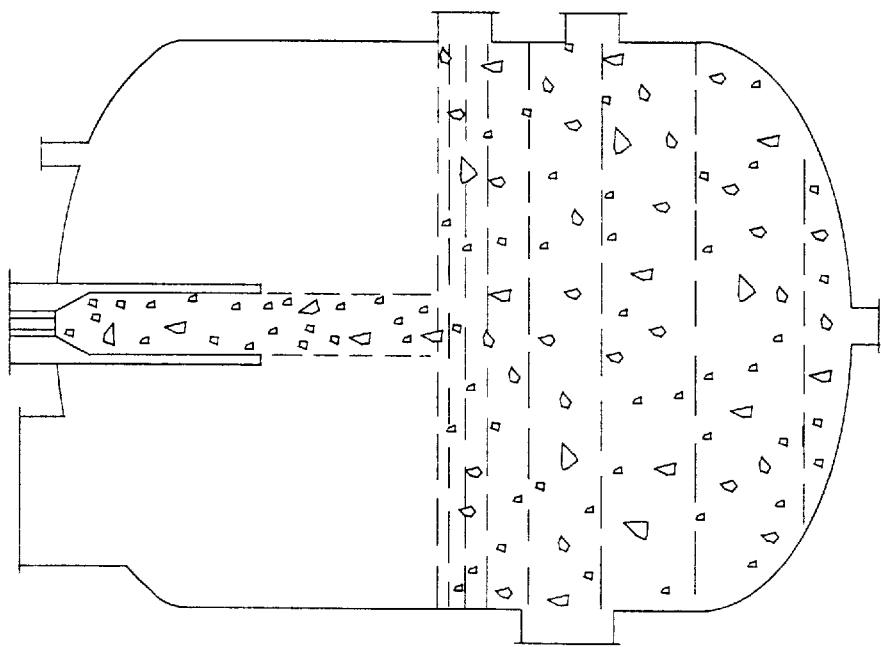
FIG. 4 is a front sectional schematic view of a prior art low pressure flash tank nozzle assembly installed in a flash tank.
Figure 5:
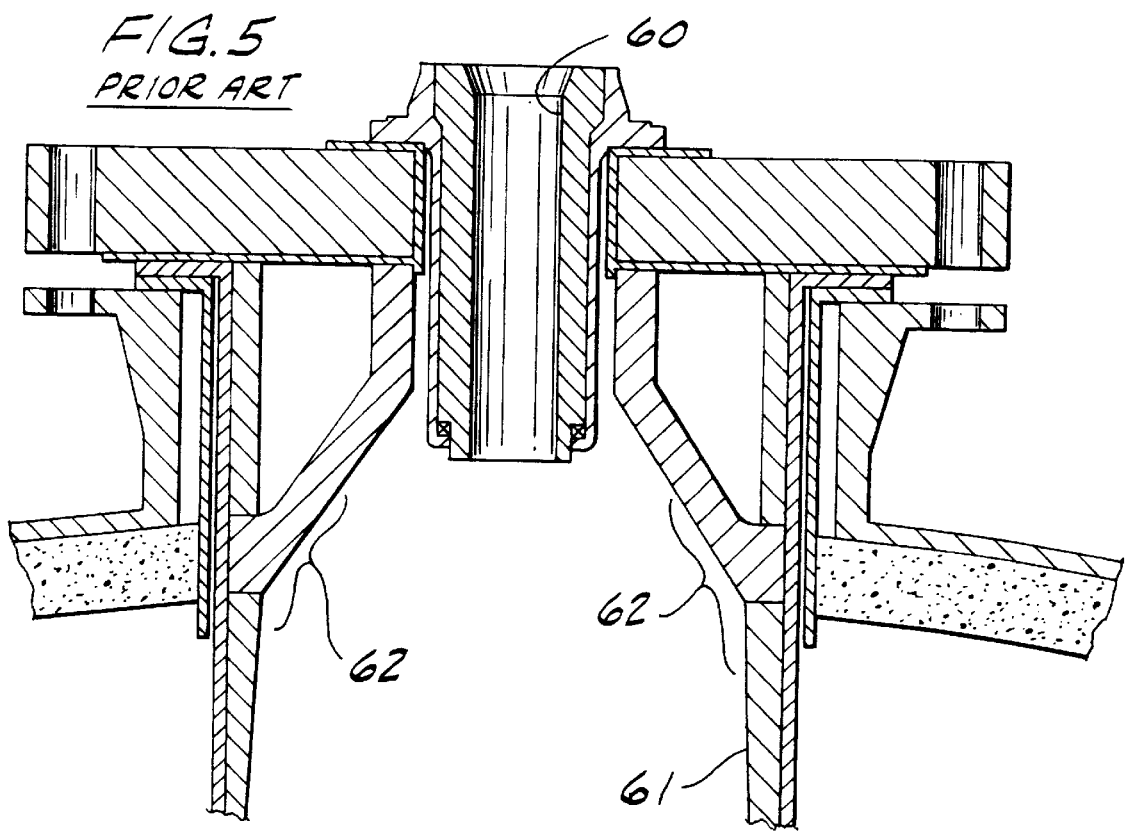
FIG. 5 is a more detailed front sectional view of a prior art low pressure flash tank nozzle assembly having a straight choke.

Turning now to FIGS. 4 and 5 there is shown a prior art nozzle assembly employed at location 42 of FIG. 2 from the second (low pressure) flash tank. The assembly consists of a straight choke 60 surrounded by a ceramic lined titanium blast tube 61. An impact zone is shown at 62 in FIG. 5 where the blast tube is impacted with steam entrained with ore slurry as it rapidly expands upon entering the flash tank.

Figure 7:
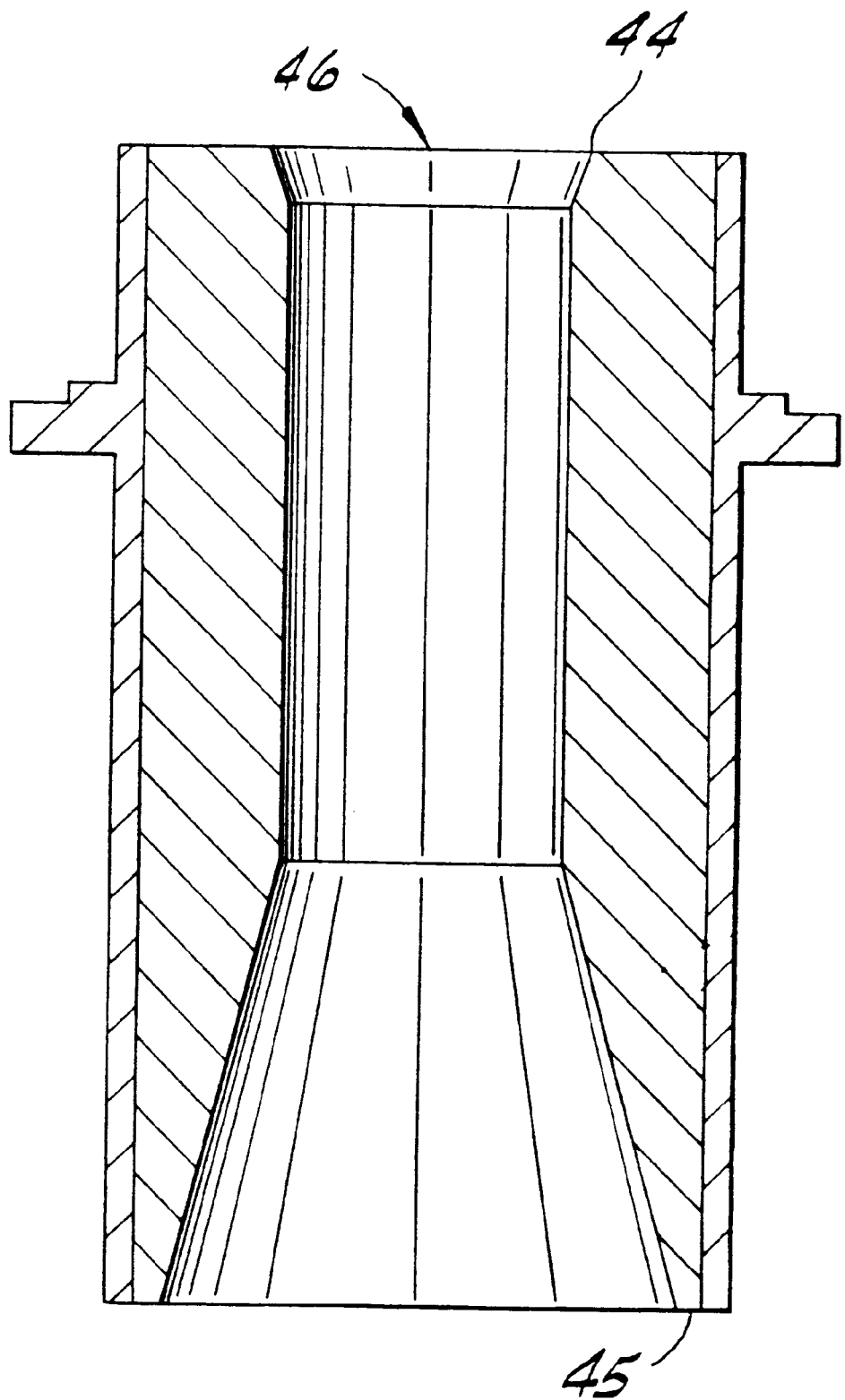
FIG. 7 is a more detailed front sectional view of the nozzle of the invention.
Figure 8:
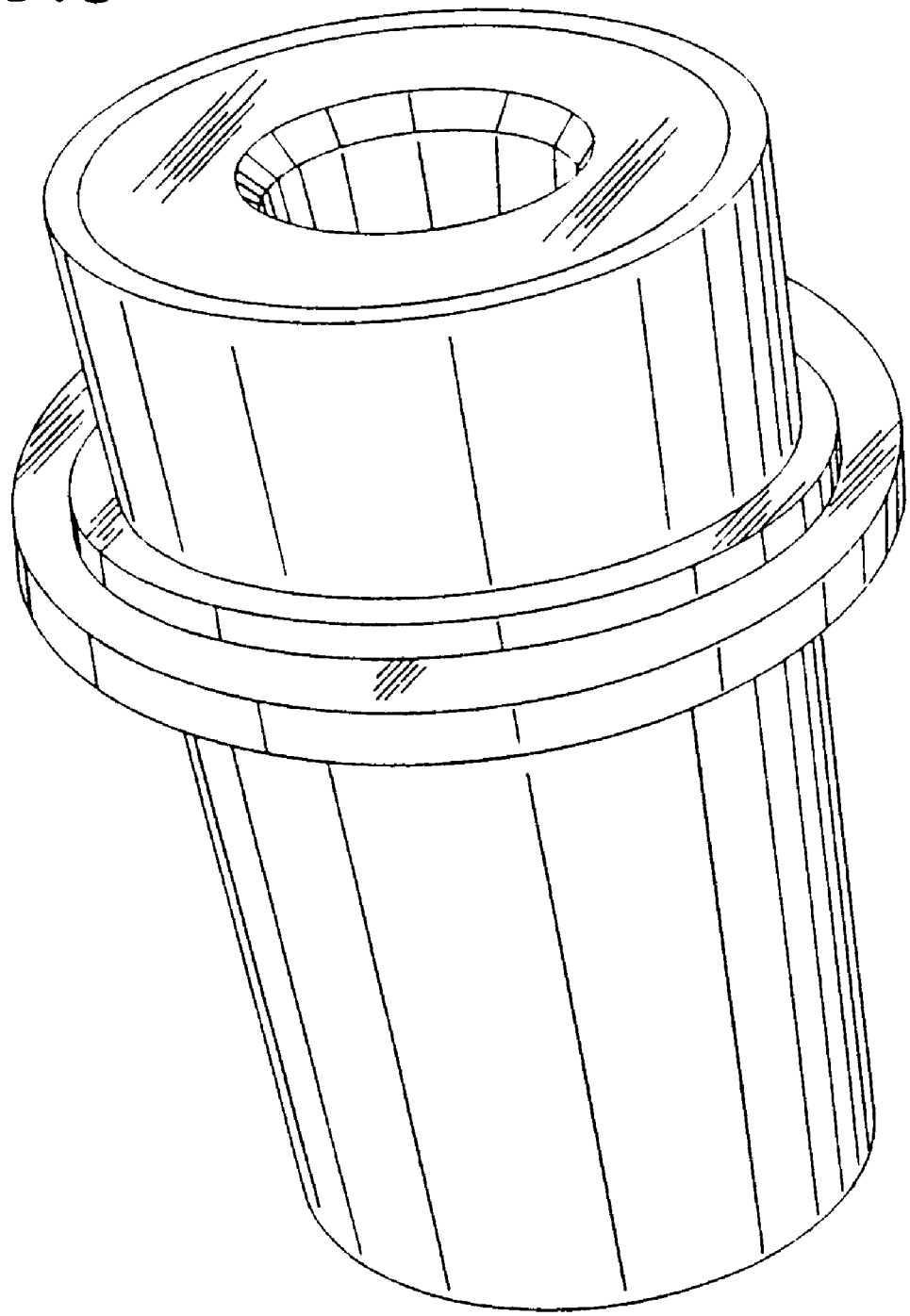
FIG. 8 is a perspective view of the nozzle of the invention.
Figure 10:
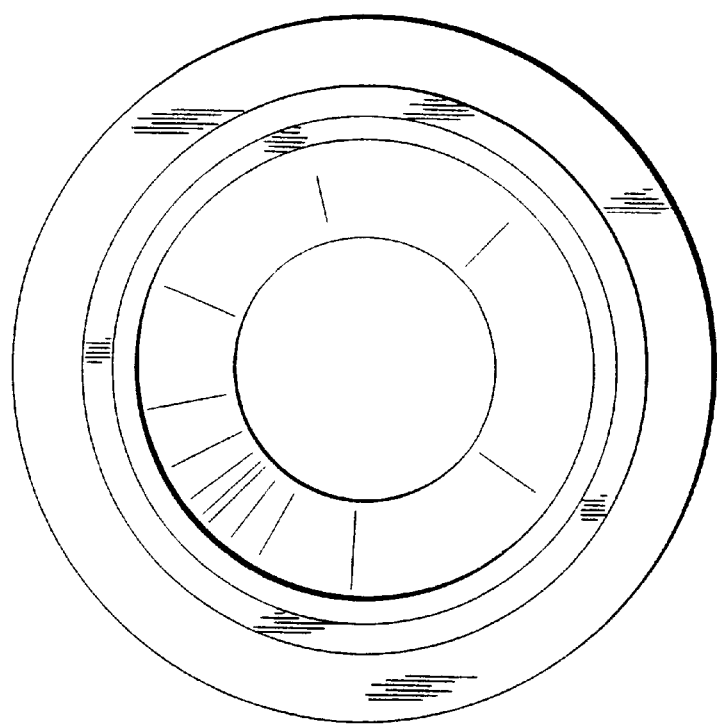
FIG. 10 is a bottom view of the nozzle of the invention.
Figure 9:
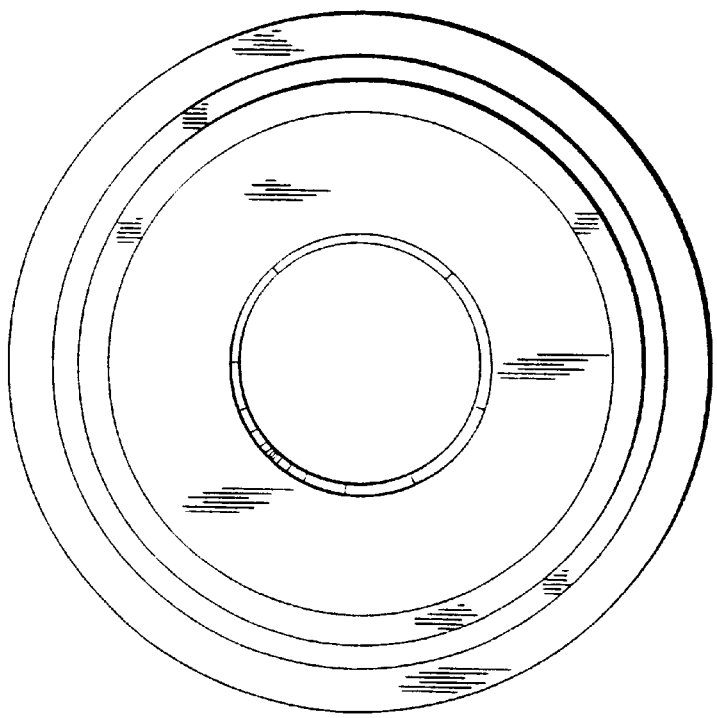
FIG. 9 is a top view of the nozzle of the invention.

FIGS. 6 and 7 show the nozzle of the invention, consisting of first and second opposite ends 44 and 45, respectively, and a steam/slurry passageway 46 extending through the nozzle from the first end 44 to the second end 45. The nozzle is constructed from a material having high hardness. One preferred material is a sintered alpha phase silicon carbide available from Carborundum (Amherst, N. Y.) under the trade designation Hexoloy SA.

Slurry and steam pass into the nozzle at the first end 44 and out of the nozzle at the second end 45 thereof to a location inside the flash tank. As shown in FIG. 7, the steam passageway flares outwardly from a location generally halfway through the passageway, axially inwardly of the second end toward the second end. FIG. 6 is a schematic representation—the actual nozzle configuration is more accurately portrayed in FIG. 7. In one preferred embodiment, the slurry flow rate through the nozzle is between about 100 tons per hour and about 500 tons per hour of ore slurry comprising between about 30% and about 70% solids by weight.

Important nozzle dimensions for the prediction and control of flashing behavior include the straight section or choke diameter, the expansion cone exit diameter, and either the expansion cone length or the expansion half-angle. By careful selection of these dimensions, it has been discovered that a relationship can be established between pressure upstream of the nozzle and pressure downstream of the nozzle, so that the development of shock waves just inside the nozzle exit, which resulted in excessive noise and vibration with prior designs, and internal wear can be minimized. In particular, the nozzle is designed so that the pressure at the discharge end is about the same as the pressure in the tank. The shock waves, noise and vibration are substantially reduced in comparison to a system operating under identical conditions (i.e., a "reference" flash tank), with the only difference being use of a straight choke flash tank nozzle (i.e., a "reference" nozzle). The shock waves inside the flash tank using the nozzle of the invention are weaker than shock waves inside a flash tank using a straight choke, but otherwise identical. Also, recondensation which occurred as a result of overflashing, which recondensation was deleterious to vapor-liquid separation within the flash tank, thereby causing excessive liquid and solids entrainment in the recycled steam to the preheat towers, can also be minimized.

The choke diameter fixes the slurry mass rate of flow entering the flash tank at a given absolute pressure (or, alternatively, fixes the upstream pressure at a given mass rate of flow) according to the equation:

$$\dot{m} = A_t \left\{ \frac{v_{fg}}{h_{fg}} \left[ \left( \frac{\partial h}{\partial p} \right)_x - v \right] - \left( \frac{\partial v}{\partial p} \right)_x \right\}_t^{-1/2}$$

where $\dot{m}$ is the mass rate of flow, $A_t$ is the choke cross-sectional area, and the remainder of the equation is a unique function of absolute pressure within the choke. A derivation of this formula is presented below in Appendix A. In one preferred embodiment where the pressure is to be let down from between about 140 psia and about 100 psia to about atmospheric, and where the mass flow rate is from about 1500 to about 3000 tons/day solids (50% pulp density), by use of the analysis of the invention, the choke diameter is from about 2.8 inches to about 4.6 inches.

The expansion cone exit diameter largely fixes the absolute exit pressure of the flashing slurry upon entering the flash tank. It is important for this exit pressure to match closely the pressure within the flash tank, for they are generally not equivalent otherwise. In the preferred embodiment where the pressure is to be let down from between about 140 psia and about 100 psia to about atmospheric, and where the mass flow rate is from about 1500 to about 3000 tons/day solids (50% pulp density), by use of the analysis of the invention, the expansion cone exit diameter is from about 7.7 inches to about 11.5 inches. The expansion half-angle is between about 22° and about 30° where the choke diameter and expansion cone exit diameter are as described in this preferred embodiment. As alluded to above, if the exit pressure is too high (i.e., the nozzle does not reduce the pressure far enough), underflashing occurs, in which case a significant amount of flashing must occur beyond the nozzle. This results in a recirculating flow pattern which causes external wear to the nozzle casing. If the exit pressure is too low (i.e., the nozzle reduces the pressure too far), overflashing occurs, in which case a shock wave develops just inside the nozzle exit resulting in excessive noise and vibration, and possibly internal wear. Also, the recondensation which must occur as a result of the overflashing may be deleterious to vapor-liquid separation within the flash tank, thereby causing excessive liquid and solids entrainment in the recycled steam to the preheat towers.

The expansion cone length fixes the expansion half-angle for any given set of choke and exit diameters. It is important that the expansion cone be between ten and twenty centimeters (about four and eight inches) long. Shorter than 10 cm, and vapor-liquid equilibrium cannot be assumed during flashing. Longer than about 20 cm, and friction losses may become significant, thereby invalidating the assumption of isentropic flow. Either of these two situations limits the predictability of flashing, and are therefore to be avoided. Hence, the optimum length of the expansion cone is taken to be about 15 cm (6 in). In the case of the low-pressure flash tanks at Barrick Goldstrike, given the necessary choke and exit diameters, this results in an expansion half-angle of about 15°. This angle also has a very slight effect on exit pressure. However, once it is fixed, then the exit diameter may be chosen with confidence from the mathematical model of slurry flashing.

Figure 11:
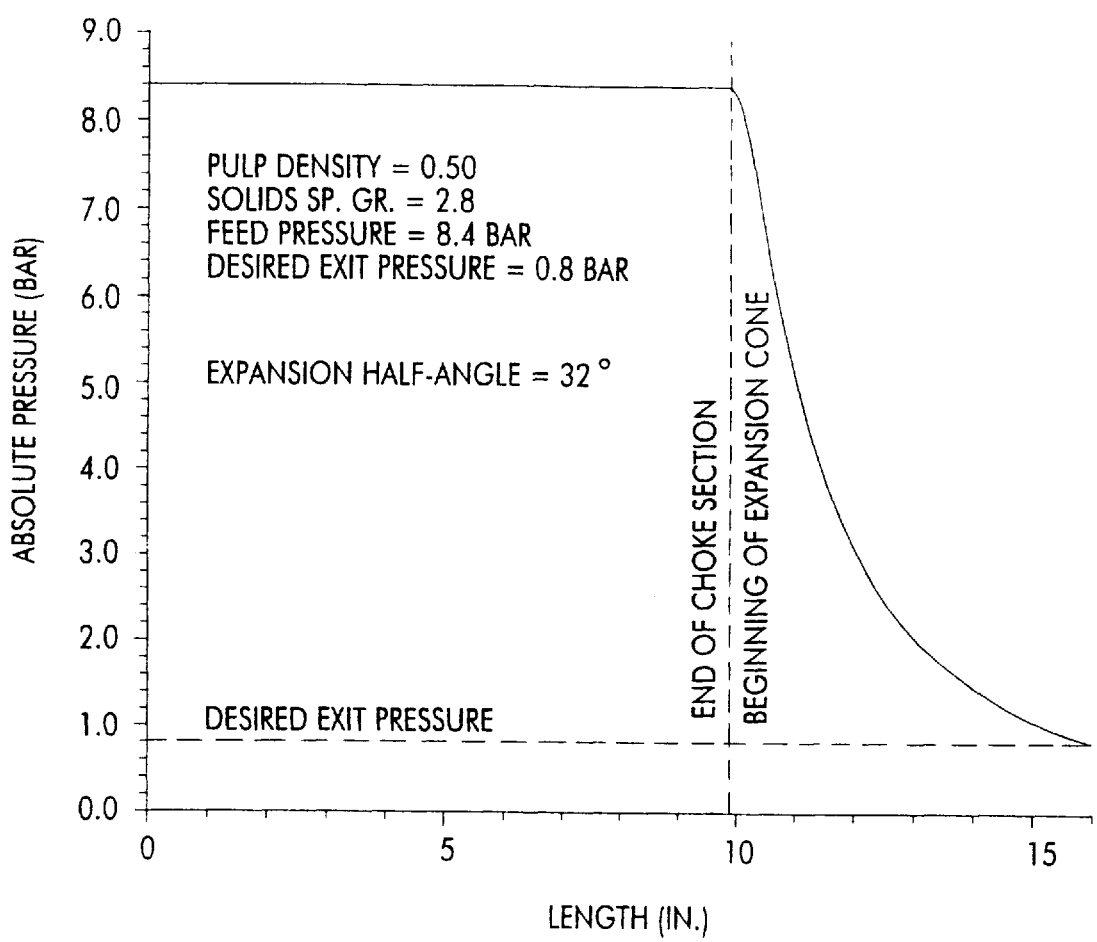
FIG. 11 is a graph depicting optimum design for a low-pressure flash nozzle.

The graph of FIG. 11 illustrates predicted absolute pressure versus length within the existing low-pressure flash system at Barrick Goldstrike at the design solids flow rate. This graph shows how the target downstream pressure may be obtained within a certain expansion cone length, given a certain expansion half-angle. This graph depicts the optimum design for the low-pressure flash nozzle, with 8.4 bar (120 psi) absolute entrance pressure, and 0.8 bar (12 psi) absolute exit pressure.

Note that the choke section is about 10" long, and the expansion cone is about 6" long. To achieve the desired pressure in this case, the expansion half-angle must be 32°, more than twice as much as 15°. In this sense, the existing Barrick design is a compromise, which compromise results in greater pressure at the end of the nozzle, in turn resulting in some degree of explosive flashing, backflow and corresponding wear at the end of the nozzle. The reason for the compromise was that a smaller expansion cone exit diameter was necessary for the nozzle to fit through the existing hole at the top of the flash tank. In view of this compromise, there is a sacrificial wear collar on the outside of the nozzle at its end.

Figure 12:
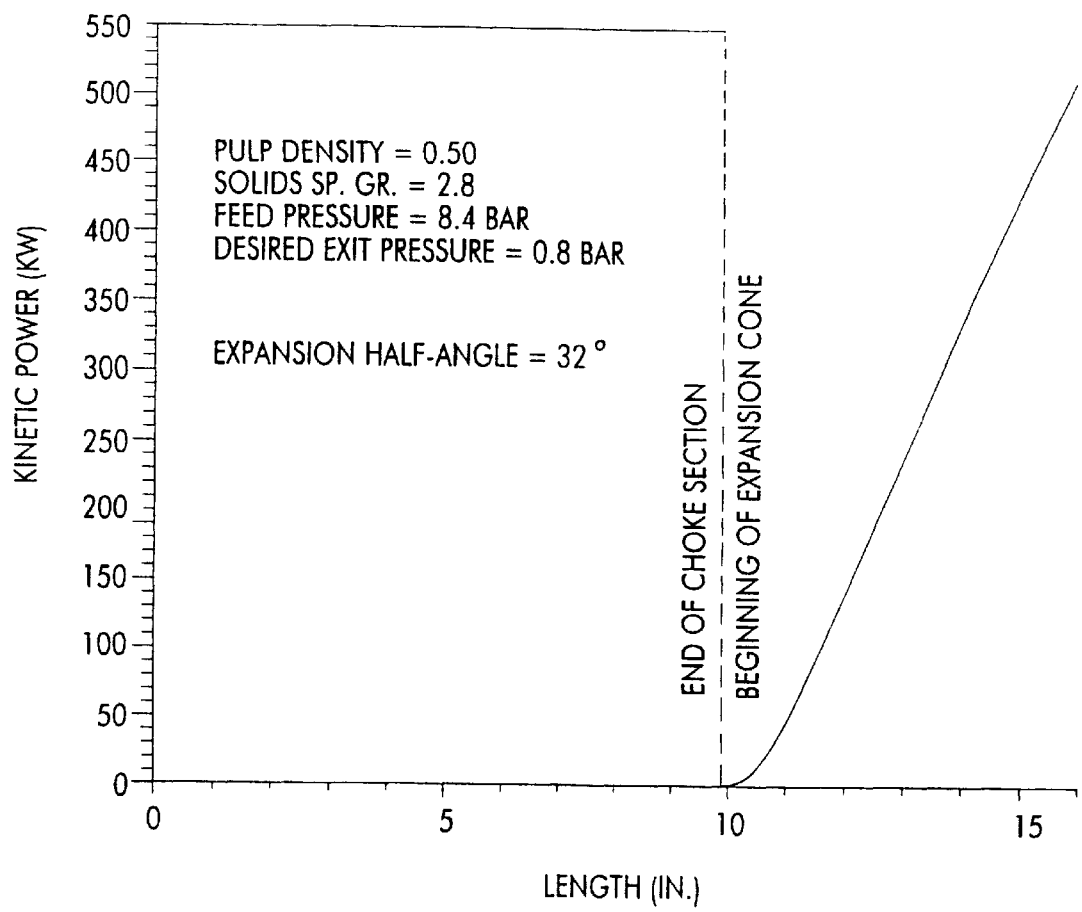
FIG. 12 is a graph depicting kinetic power due to steam expansion.

Kinetic power due to steam expansion developed within the optimum design at the pressures shown in FIG. 11 is depicted in FIG. 12. Note that the kinetic power developed is only about half of a megawatt. This is approximately 8 times less than the original choke/blast-tube apparatus (which self-destructed).

In one preferred embodiment of the invention shown in FIG. 7 the straight section or choke diameter is between about 3½ and about 4½ inches, preferably between about 3.8 and 4.1 inches. The expansion cone exit diameter is between about 7 and about 7½ inches, preferably between about 7.1 and 7.4 inches. The expansion cone length is between about 5¾ inches and about 6¾ inches, preferably between about 6 and 6.2 inches. The expansion half-angle is between about 12° and about 18°, preferably between about 14° and about 16°. The straight section has a length of between about 8 inches and about 12 inches, more preferably between about 9½ inches and about 10½ inches.

EXAMPLE 1

A nozzle as described above and shown in FIG. 7 was made from Hexoloy SA available from Carborundum. The nozzle had an inner diameter of 4 inches in the first upper segment, and upper segment length of 10 inches, a lower segment length of 6.1 inches, the lower segment flaring at an angle of 15° from an inner diameter of 4 inches to an inner diameter of 7.25 inches. This nozzle was installed in a low pressure flash tank for reducing slurry pressure from about 120 psig to about atmospheric pressure. The nozzle was installed without a blast tube. After 30 weeks, even without a blast tube, no significant wear was visible on the nozzle nor on the flash tank vessel walls.

As various changes could be made in the above embodiments without departing from the scope of the invention, it is intended that all matter contained in the above description shall be interpreted as illustrative and not in a limiting sense.

Appendix A

Formulation of the Equations Governing Flashing Flow of Slurries

Model assumptions:

1. Homogeneous flow—vapor, liquid, and solid phases are flowing at the same velocity at any point within the system.

2. Vapor-liquid equilibrium—flashing occurs via a known thermodynamic path.
3. Isentropic flow—the slurry loses no energy to friction.
4. Adiabatic flow—the slurry gains no heat, and does no work.
5. Solid-fluid thermal equilibrium—all phases at a uniform temperature at any point within the system.

Homogeneous flow theory provides the simplest technique for analyzing multiphase flows, and can be fairly accurate so long as the phases are intimately mixed, which is the case in flashing slurries. The assumption of vapor-liquid equilibrium is more troublesome. It is known that rapid acceleration and pressure changes render equilibrium theory inaccurate for describing the discharge of flashing steam-water mixtures through orifices, making it necessary to consider the rates of bubble nucleation and growth in the superheated liquid. However, controlled expansion through nozzles as short as 10 cm can be predicted with surprising accuracy.

In flashing flow through nozzles, pressure drops are generally very large, and thus friction becomes an insignificant source of entropy. Furthermore, in the absence of heat sources or turbines, the adiabatic assumption can be safely made. Finally, the rate of heat transfer from finely ground solids can be safely assumed high enough to ensure thermal equilibrium between the solid and fluid phases.

Derivation of the model equations:

The basic equations for steady one-dimensional homogeneous equilibrium flow in a duct are:

$$\text{Continuity: } \dot{m} = \rho u A = \frac{uA}{v} = \text{constant} \tag{1}$$

$$\text{Momentum: } \dot{m}\frac{du}{dz} = -A\frac{dp}{dz} - P\tau_w - A\rho g \cos\theta \tag{2}$$

$$\text{Energy: } \frac{dq}{dz} - \frac{dw}{dz} = \dot{m}\frac{d}{dz}\left(h + \frac{u^2}{2} + gz\right) \tag{3}$$

where $\dot{m}$ is the slurry mass rate of flow, $\rho$ and $v$ are the slurry density and specific volume, $u$ is velocity, A and P are the duct cross-sectional area and perimeter, $\tau_w$ is the average wall shear stress, $dq/dz$ and $dw/dz$ are the rate of heat input and work output per unit length of duct, respectively, $z$ is the vertical coordinate, and $\theta$ is the angle of inclination of the duct to the vertical. Either $\rho$ or $1/v$ may be used to express slurry density. For our purposes, $v$ is more convenient.

Equation (2) may be rewritten as an explicit equation for the pressure drop:

$$-\frac{dp}{dz} = \frac{P}{A}\tau_w + \frac{\dot{m}}{A}\frac{du}{dz} + \rho g \cos\theta \tag{5}$$

The three terms on the right side can then be regarded as frictional, accelerational, and gravitational components of the pressure drop:

$$-\frac{dp}{dz} = -\left(\frac{dp}{dz}\right)_F - \left(\frac{dp}{dz}\right)_A - \left(\frac{dp}{dz}\right)_G \tag{6}$$

In the absence of significant friction losses, and when gravitational effects are negligible:

$$\left(\frac{dp}{dz}\right)_F = \left(\frac{dp}{dz}\right)_G = 0 \tag{7}$$

and Newton's second law of motion can be stated:

$$-\frac{dp}{dz} = -\left(\frac{dp}{dz}\right)_A = \frac{\dot{m}}{A}\frac{du}{dz} \tag{8}$$

Assuming steady flow, and since each phase within the slurry shares the same velocity (homogeneous flow):

$$-\frac{dp}{dz} = G\frac{du}{dz} \tag{9}$$

where G is the rate of slurry mass flux, or the slurry mass velocity. Combining equations (1) and (8):

$$-\frac{dp}{dz} = G\frac{d}{dz}\left(\frac{\dot{m}v}{A}\right) \tag{10}$$

Expanding this differential:

$$-\frac{dp}{dz} = G^2\frac{dv}{dz} - \frac{G^2 v}{A}\frac{dA}{dz} \tag{11}$$

By definition:

$$v \equiv (1-S)[xv_g + (1-x)v_f] + Sv_s$$

$$\therefore \frac{dv}{dz} = (1-S)\left[v_{fg}\frac{dx}{dz} + x\frac{dv_g}{dz} + (1-x)\frac{dv_f}{dz}\right]$$

where x is the steam quality or mass fraction of the total water occurring as steam, S is the pulp density or solids mass fraction within the slurry, and the subscripts f, g, fg and s refer to liquid water (fluid), steam (gas), the difference between the two, and solids, respectively. For a vapor-liquid system, specific volume is a unique function of pressure, thus:

$$\frac{dv}{dz} = (1-S)v_{fg}\frac{dx}{dz} + \left(\frac{\partial v}{\partial p}\right)_x \frac{dp}{dz} \tag{13}$$

where:

$$\left(\frac{\partial v}{\partial p}\right)_x = (1-S)\left[x\frac{dv_g}{dp} + (1-x)\frac{dv_f}{dp}\right]$$

Typically, the steam quality gradient, $dx/dz$, may be calculated from the energy equation by equating heat transfer to latent heat changes. However, if significant flashing occurs, quality is a function of both enthalpy, h, and pressure, thus:

$$x = x(h, p) \tag{15}$$

$$\therefore \frac{dx}{dz} = \left(\frac{\partial x}{\partial h}\right)_p \frac{dh}{dz} + \left(\frac{\partial x}{\partial p}\right)_h \frac{dp}{dz}$$

By definition:

$$h \equiv (1-S)[xh_g + (1-x)h_f] + Sh_s \quad (16)$$

$$\therefore \left(\frac{\partial x}{\partial h}\right)_p = \frac{1}{(\partial h/\partial x)_p} = \frac{1}{(1-S)h_{fg}}$$

Also, by Euler's rule:

$$\left(\frac{\partial x}{\partial p}\right)_h = -\left(\frac{\partial x}{\partial h}\right)_p\left(\frac{\partial h}{\partial p}\right)_x = -\frac{1}{(1-S)h_{fg}}\left(\frac{\partial h}{\partial p}\right)_x \quad (17)$$

where:

$$\left(\frac{\partial h}{\partial p}\right)_x = (1-S)\left[x\frac{dh_g}{dp} + (1-x)\frac{dh_f}{dp}\right] + SC_{ps}\frac{dT}{dp}$$

where $C_{ps}$ is the heat capacity of the solids, and the temperature T is a unique function of pressure from the vapor-liquid equilibrium. Thus, combining equations (13), (14) and (15), the steam quality gradient is expressed:

$$\frac{dx}{dz} = \frac{1}{(1-S)h_{fg}}\left[\frac{dh}{dz} - \left(\frac{\partial h}{\partial p}\right)_x\frac{dp}{dz}\right] \quad (19)$$

and combining this with equation (12) gives the specific volume gradient:

$$\frac{dv}{dz} = \frac{v_{fg}}{h_{fg}}\frac{dh}{dz} + \left[\left(\frac{\partial v}{\partial p}\right)_x - \frac{v_{fg}}{h_{fg}}\left(\frac{\partial h}{\partial p}\right)_x\right]\frac{dp}{dz} \quad (20)$$

In the absence of a significant potential energy gradient and under adiabatic conditions, equation (2) may be rearranged to solve for the enthalpy gradient:

$$\frac{dh}{dz} = -u\frac{du}{dz} \quad (21)$$

$$\therefore h_0 \equiv h + \frac{u^2}{2} = constant$$

where $h_0$ is the "stagnation enthalpy." Combining equations (1), (8), and (18) gives the enthalpy gradient as a function of pressure drop:

$$\frac{dh}{dz} = v\frac{dp}{dz} \quad (22)$$

which, when combined with equation (17), gives the final expression for the specific volume gradient:

$$\frac{dv}{dz} = \left\{\left(\frac{\partial v}{\partial p}\right)_x - \frac{v_{fg}}{h_{fg}}\left[\left(\frac{\partial h}{\partial p}\right)_x - v\right]\right\}\frac{dp}{dz} \quad (23)$$

which, when combined with equation (10), gives the pressure drop as a function of system operating variables and steam table data only:

$$-\frac{dp}{dz} = \frac{-\frac{G^2 v}{A}\frac{dA}{dz}}{1 + G^2\left\{\left(\frac{\partial v}{\partial p}\right)_x - \frac{v_{fg}}{h_{fg}}\left[\left(\frac{\partial h}{\partial p}\right)_x - v\right]\right\}} \quad (24)$$

The choking condition is thus:

$$M^2 = -G^2\left\{\left(\frac{\partial v}{\partial p}\right)_x - \frac{v_{fg}}{h_{fg}}\left[\left(\frac{\partial h}{\partial p}\right)_x - v\right]\right\} = 1 \quad (25)$$

where M is the Mach number. Hence, the critical slurry mass rate of flow is determined by:

$$\dot{m} = A_t\left\{\frac{v_{fg}}{h_{fg}}\left[\left(\frac{\partial h}{\partial p}\right)_x - v\right] - \left(\frac{\partial v}{\partial p}\right)_x\right\}_t^{-1/2} \quad (26)$$

where the subscript t denotes conditions in the "throat" or narrowest section of the choke. Finally, combining equations (16) and (19) results in the final expression for steam quality gradient:

$$\frac{dx}{dz} = \frac{1}{(1-S)h_{fg}}\left[v - \left(\frac{\partial h}{\partial p}\right)_x\right]\frac{dp}{dz} \quad (27)$$

Equations (24) and (27) are the working equations of the model. With a given choke or nozzle and the steam tables, these two equations may be intergrated numerically to determine the critical slurry mass rate of flow, and the corresponding fluid properties, anywhere in the nozzle.

Quantities of interest for plotting vs length along the nozzle include pressure, stem quality, Mach number, and the rate of kinetic energy, or kinetic power:

$$\dot{E}_K = \frac{\dot{m}u^2}{2} = \frac{\dot{m}^3 v^2}{2A^2}$$

What is claimed is:

1. A wear-resistant flash tank pressure let down nozzle for use in passing an ore slurry into an ore slurry flash tank to release steam from the slurry and reduce the pressure of the slurry, the nozzle comprising an inlet end, a discharge end, a tubular passageway extending therebetween for passage of the slurry from a location outside the flash tank in fluid flow communication with said inlet end, the slurry passageway comprising a choke comprising a zone of the passageway in which its cross-sectional area is smallest, the passageway flaring with respect to the axis thereof toward said discharge end to define an expansion cone; and the cross-sectional area of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke.

2. The nozzle of claim 1 wherein the cross-sectional area of the choke and the exit diameter of the expansion cone are selected to establish a relationship between pressure upstream of the nozzle and pressure in the flash tank so that under a flowrate of up to about 500 tons per hour of ore slurry comprising between about 30% and about 70% solids by weight, shock waves inside the flash tank are weaker than shock waves inside a reference flash tank having identical dimensions and configuration and operating under identical conditions except having a reference pressure let down nozzle consisting of a straight choke.

3. The nozzle of claim 2 wherein the expansion cone has a half angle of between about 20° and about 32°, and the choke cross-sectional area is determined by a function relating mass flow rate of slurry through the nozzle and pressure within the nozzle.

4. A wear-resistant flash tank pressure let down nozzle for use in passing an ore slurry into an ore slurry flash tank to release steam from the slurry and reduce the pressure of the slurry, the nozzle comprising an inlet end, a discharge end, a tubular passageway extending therebetween for passage of the slurry from a location outside the flash tank in fluid flow communication with said inlet end, the slurry passageway comprising a choke comprising a zone of the passageway in which its cross-sectional area is smallest, the passageway flaring with respect to the axis thereof toward said discharge end to define an expansion cone;

the cross-sectional area of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke; and wherein the choke has a diameter between about 2.8 inches and about 4.6 inches, the expansion cone exit diameter is between about 7.7 inches and about 11.5 inches, and the expansion cone length is between about 4 and about 8 inches.

5. The nozzle of claim 4 wherein the expansion cone has a half angle of between about 20° and about 32°.

6. A wear-resistant flash tank pressure let down nozzle for use in passing an ore slurry into an ore slurry flash tank to release steam from the slurry and reduce the pressure of the slurry, the nozzle comprising an inlet end, a discharge end, a tubular passageway extending therebetween for passage of the slurry from a location outside the flash tank in fluid flow communication with said inlet end, the slurry passageway comprising a choke comprising a zone of the passageway in which its cross-sectional area is smallest, the passageway flaring with respect to the axis thereof toward said discharge end to define an expansion cone; and the cross-sectional area of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke;

wherein the nozzle has a choke diameter of between about 3½ and about 4½ inches, an expansion cone exit diameter of between about 7 and about 7½ inches, and an expansion cone length of between about 5¾ inches and about 6¼ inches.

7. The nozzle of claim 6 wherein the expansion cone has a half angle of between about 14° and about 16°.

8. A process for reducing the pressure of pressure oxidized ore slurry from above about 100 psig to about atmospheric, the process comprising passing up to about 500 tons per hour ore slurry comprising between about 30% and about 70% solids by weight through a nozzle into a flash tank, the nozzle disposed on the top of the flash tank and comprising an inlet end and a discharge end, and a slurry passageway extending through the nozzle from the inlet end to the discharge end for passage of the slurry into the flash tank from a location outside the flash tank, the slurry passageway comprising a choke comprising a zone of the passageway in which its cross-sectional area is the smallest, the passageway flaring with respect to the axis thereof toward said discharge end to define an expansion cone, the choke cross-sectional area is determined by a function relating mass flow rate of slurry through the nozzle and pressure within the nozzle, and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke.

9. A process for reducing the pressure of pressure oxidized ore slurry from above about 100 psig to about atmospheric, the process comprising passing up to about 500 tons per hour ore slurry comprising between about 30% and about 70% solids by weight through a nozzle into a flash tank, the nozzle disposed on the top of the flash tank and comprising an inlet end and a discharge end, and a slurry passageway extending through the nozzle from the inlet end to the discharge end for passage of the slurry into the flash tank from a location outside the flash tank, the slurry passageway comprising a choke comprising a zone of the passageway in which its cross-sectional area is the smallest, the passageway flaring with respect to the axis thereof toward said discharge end to define an expansion cone, the choke cross-sectional area is determined by a function relating mass flow rate of slurry through the nozzle and pressure within the nozzle, and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke;

wherein the choke has a diameter between about 2.8 inches and about 4.6 inches, the expansion cone exit diameter is between about 7.7 inches and about 11.5 inches, and the expansion cone length is between about 4 and about 8 inches.

10. The process of claim 9 wherein the expansion cone has a half angle of between about 20° and about 32°.

11. A process for reducing the pressure of pressure oxidized ore slurry from above about 100 psig to about atmospheric, the process comprising passing up to about 500 tons per hour ore slurry comprising between about 30% and about 70% solids by weight through a nozzle into a flash tank, the nozzle disposed on the top of the flash tank and comprising an inlet end and a discharge end, and a slurry passageway extending through the nozzle from the inlet end to the discharge end for passage of the slurry into the flash tank from a location outside the flash tank, the slurry passageway comprising a choke comprising a zone of the passageway in which its cross-sectional area is the smallest, the passageway flaring with respect to the axis thereof toward said discharge end to define an expansion cone, the choke cross-sectional area is determined by a function relating mass flow rate of slurry through the nozzle and pressure within the nozzle, and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle consisting of a straight choke;

wherein the nozzle has a choke diameter of between about 3½ and about 4½ inches, an expansion cone exit diameter of between about 7 and about 7½ inches, and an expansion cone length of between about 5¾ inches and about 6¼ inches.

12. The process of claim 11 wherein the expansion cone has a half angle of between about 14° and about 16°.

13. The process of claim 8 wherein the flash tank comprises a vapor outlet for steam generated therein and a liquid outlet for cooled slurry, the configuration of said tank and the position of said nozzle being such that, under slurry flashing conditions:

the discharge end of said nozzle is spaced above the level of ore slurry in the tank, and the spacing of said discharge end from said slurry level and the depth of the slurry in the tank are sufficient to preclude substantial erosion of the bottom wall of the tank by the impact of slurry entering and flashing within the tank;

the head space above the ore slurry level and the horizontal cross-section of the tank are sufficient for vapor/liquid disengagement; and the depth of said ore slurry is sufficient to provide a liquid seal for said cooled slurry outlet.

14. A wear-resistant flash tank pressure let down nozzle for use in passing an ore slurry into an ore slurry flash tank to release steam from the slurry and reduce the pressure of the slurry, the nozzle comprising:

an inlet end;

an outlet end;

a tubular passageway extending between the inlet end and the outlet end comprising a choke consisting of a smallest diameter portion of the passageway, and an expansion cone defined by the passageway flaring with respect to the axis thereof toward the outlet end; and the diameter of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle wherein the passageway is cylindrical from the narrowest portion to the outlet end.

15. A wear-resistant flash tank pressure let down nozzle for use in passing an ore slurry into an ore slurry flash tank to release steam from the slurry and reduce the pressure of the slurry, the nozzle comprising:

an inlet end;

an outlet end;

a tubular passageway extending between the inlet end and the outlet end comprising a choke consisting of a smallest diameter portion of the passageway, and an expansion cone defined by the passageway flaring with respect to the axis thereof toward the outlet end; and the diameter of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle wherein the passageway is cylindrical from the narrowest portion to the outlet end;

wherein the choke has a diameter between about 2.8 inches and about 4.6 inches, the expansion cone exit diameter is between about 7.7 inches and about 11.5 inches, the expansion cone length is between about 4 and about 8 inches, and the expansion cone has a half angle of between about 20° and about 32°.

16. A wear-resistant flash tank pressure let down nozzle for use in passing an ore slurry into an ore slurry flash tank to release steam from the slurry and reduce the pressure of the slurry, the nozzle comprising:

an inlet end;

an outlet end;

a tubular passageway extending between the inlet end and the outlet end comprising a choke consisting of a smallest diameter portion of the passageway, and an expansion cone defined by the passageway flaring with respect to the axis thereof toward the outlet end; and the diameter of the choke and the exit diameter of the expansion cone being selected to establish a relationship between pressure upstream of the nozzle and pressure in the flash tank so that shock waves inside the flash tank are weaker than shock waves inside a reference flash tank having identical dimensions and configuration and operating under identical conditions except having a reference pressure let down nozzle wherein the passageway is cylindrical from the narrowest portion to the outlet end;

wherein the nozzle has a choke diameter of between about 3½ and about 4½ inches, the expansion cone exit diameter is between about 7 and about 7½ inches, the expansion cone length is between about 5¾ inches and about 6¼ inches, and the expansion cone has a half angle of between about 14° and about 16°.

17. A wear-resistant flash tank pressure let down nozzle for use in passing an ore slurry into an ore slurry flash tank to release steam from the slurry and reduce the pressure of the slurry, the nozzle comprising:

an inlet end;

an outlet end;

a tubular passageway extending between the inlet end and the outlet end comprising a choke consisting of a smallest diameter portion of the passageway, and an expansion cone defined by the passageway flaring with respect to the axis thereof toward the outlet end;

the diameter of the choke being determined by the mass flow rate of the slurry through the nozzle and pressure within the nozzle; and the exit diameter of the expansion cone being selected so that the pressure of the slurry at the outlet end is about the same as the pressure in the flash tank.

18. A wear-resistant flash tank pressure let down nozzle for use in passing an ore slurry into an ore slurry flash tank to release steam from the slurry and reduce the pressure of the slurry, the nozzle comprising:

an inlet end;

an outlet end;

a tubular passageway extending between the inlet end and the outlet end comprising a choke consisting of a smallest diameter portion of the passageway, and an expansion cone defined by the passageway flaring with respect to the axis thereof toward the outlet end;

the diameter of the choke being determined by the mass flow rate of the slurry through the nozzle and pressure within the nozzle; and the exit diameter of the expansion cone being selected so that the pressure of the slurry at the outlet end is about the same as the pressure in the flash tank;

wherein the choke has a diameter between about 2.8 inches and about 4.6 inches, the expansion cone exit diameter is between about 7.7 inches and about 11.5 inches, the expansion cone length is between about 4 and about 8 inches, and the expansion cone has a half angle of between about 20° and about 32°.

19. A wear-resistant flash tank pressure let down nozzle for use in passing an ore slurry into an ore slurry flash tank to release steam from the slurry and reduce the pressure of the slurry, the nozzle comprising:

an inlet end;

an outlet end;

a tubular passageway extending between the inlet end and the outlet end comprising a choke consisting of a smallest diameter portion of the passageway, and an expansion cone defined by the passageway flaring with respect to the axis thereof toward the outlet end;

the diameter of the choke being determined by the mass flow rate of the slurry through the nozzle and pressure within the nozzle; and the exit diameter of the expansion cone being selected so that the pressure of the slurry at the outlet end is about the same as the pressure in the flash tank;

wherein the nozzle has a choke diameter of between about 3½ and about 4½ inches, the expansion cone exit diameter is between about 7 and about 7½ inches, the expansion cone length is between about 5¾ inches and about 6¼ inches, and the expansion cone has a half angle of between about 14° and about 16°.

* * * * *